Nov. 3, 1925. 1,560,215
W. B. CLIFFORD
LIFTING DEVICE FOR VEHICLE WHEELS
Filed Nov. 18, 1921
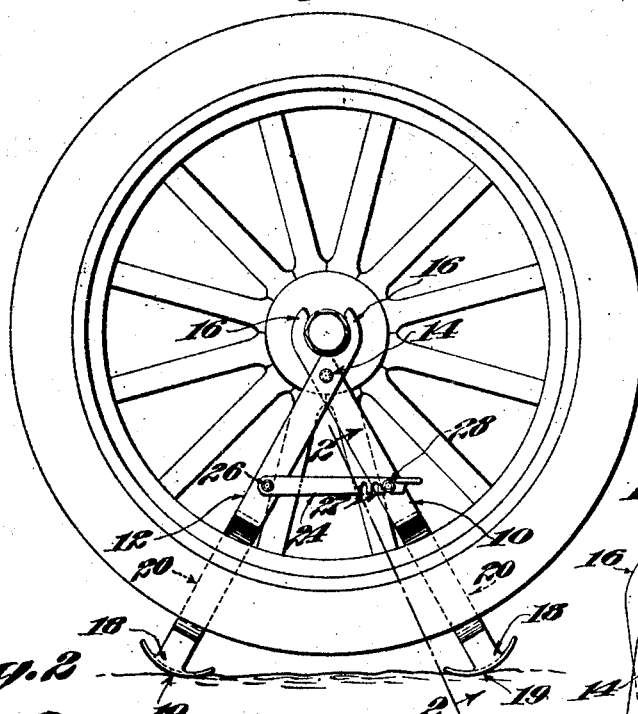
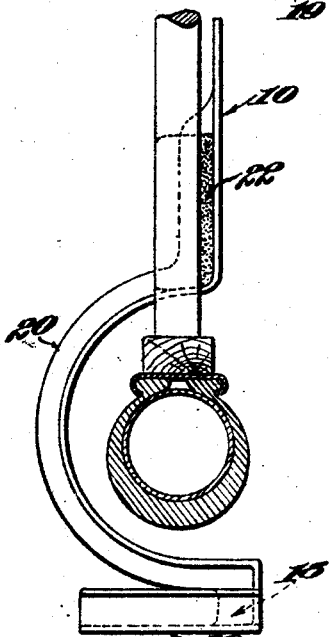
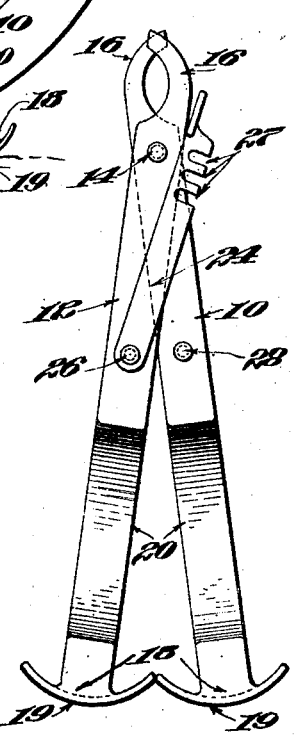

Patented Nov. 3, 1925.

1,560,215

UNITED STATES PATENT OFFICE.

WALTER B. CLIFFORD, OF VIVIAN, WEST VIRGINIA.

LIFTING DEVICE FOR VEHICLE WHEELS.

Application filed November 18, 1921. Serial No. 516,088.

*To all whom it may concern:*

Be it known that I, WALTER B. CLIFFORD, a citizen of the United States, residing at Vivian, in the county of McDowell and State of West Virginia, have invented certain new and useful Improvements in Lifting Devices for Vehicle Wheels; and I do hereby declare the following to be a full, clear, and exact description of the invention, such as will enable others skilled in the art to which it appertains to make and use the same.

The present invention relates to lifting apparatus and more particularly apparatus of this character designed for jacking the wheel of a motor vehicle.

It will be obvious to those skilled in the art that it is desirable to provide a simple and efficient form of jacking device which will elevate the wheel of a motor vehicle from the ground and hold it firmly and rigidly in elevated position without the necessity of reaching beneath the vehicle or manually operating the jack. Attempts have been made heretofore to provide jacking devices of this general character but these constructions have invariably been deficient in their operation, due to several factors. In some cases the operation of such devices requires a previous drilling of the motor vehicle wheels. In other cases the use of the devices may substantially damage the wheels. In other cases the devices fail, due to their inability to rigidly and firmly support the wheel in an elevated position.

The object of the present invention is to provide a simple and efficient form of jacking device which may be readily applied in operative position and which will elevate and hold the wheel in elevated position firmly and rigidly and without the liability of the wheel dropping to the ground.

With this object in view one feature of the invention contemplates the provision of a jacking device having means for engaging with and firmly holding the hub of the wheel to be lifted connected with a supporting arm which projects outwardly and behind the felloe of the wheel into a position beneath the tread of the wheel, together with locking connections designed to hold the arm against one of the wheel spokes in such a manner that the arm is positively rotated with the wheel to cause the latter to ride forwardly onto the supporting base of the arm.

In the simplest and most efficient form of the invention which has yet been devised, two supporting arms are pivoted at their upper ends and are provided with hub engaging members designed to grip the hub between them. These arms project outwardly from the hub toward the rim of the wheel with portions projecting behind the rim and terminating in supporting feet located beneath the tread of the wheel. After application of the jacking device to the wheel the two arms are locked in contact with adjacent spokes by a locking bar or similar construction, which holds the arms rigidly in position with the upper ends gripping the wheel hub.

Still further features of the invention consist in certain novel features of construction, combination and arrangements of parts hereinafter described and claimed, the advantages of which will be obvious to those skilled in the art from the following description.

In the accompanying drawings illustrating the preferred form of the invention Fig. 1 represents a wheel supported upon the jacking device with the two arms of the jacking device located in operative position with respect to the wheel; Fig. 2 is a detail illustrating a side elevation of one of the arms taken upon the line 2—2 of Fig. 1; and Fig. 3 is a view of the jacking device removed from the wheel and folded up for storage.

The jacking device shown in the illustrated embodiment of the invention comprises two similar arms 10 and 12 which are pivoted together at 14 adjacent their upper ends. Each of these arms is provided at the upper portion with a curved end 16 adapted to extend partly around and grip the wheel hub, as shown clearly in Fig. 1, the two arms cooperating to form a hub clamp when the jack is locked to the wheel. Each of the arms, as indicated, is of sufficient length to extend from the hub of the wheel outwardly beyond the tread face and terminates in a foot 18 of ample size and provided with a curved supporting surface 19. The arms are adapted to extend rearwardly behind the felloe and tire of the wheel to permit the free removal of the tire and demountable rim without interference from the jacking device. To this end, as shown clearly in the drawings, each arm is formed with a rearwardly extending curved portion 20 which terminates in the foot 18, as shown clearly in Fig. 2. This curved portion may take the general form of a U so that the foot 18 is located directly beneath the tread surface of the wheel and the point of support of the jacking device. In other words, a vertical plane passing through the line of engagement between the arms and the hub also passes through the foot 18, thus avoiding any tendency for the jacking device to become displaced with respect to the wheel, due to the weight of the motor vehicle thereon. As indicated clearly in Fig. 1, the two arms 10 and 12 extend outwardly and straddle adjacent spokes of the wheel, the areas at which the arms contact with the spokes being preferably faced with a yielding material, indicated at 22, to avoid marring the finish of the spokes. The arms are locked in spoke engaging position by a locking bar 24, which is pivoted to one of the arms at 26 and is provided with a series of recesses 27 adapted to engage with a pin 28 secured in the cooperating arm 10.

In applying this type of jacking device, the lower ends of the two arms are first thrust into the spaces between the spokes and the upper ends of the arms are then moved inwardly until they are positioned beneath the hub of the wheel, the arms in the meantime being spread apart sufficiently to permit the upper curved ends to be spaced about the hub, as shown. With the arms in this position, the locking bar may then be dropped to lock the two arms in operative position with the upper ends gripping the hub. When locked in this position the hub is firmly gripped and the arms contact loosely with adjacent spokes. Thereafter by moving the motor vehicle forwardly or rearwardly as desired the wheel with the jacking device connected thereto is rotated in a manner which will be obvious to cause the elevation of the wheel upon the jacking device, the latter rotating with the wheel through the engagement of either of the arms 10 or 12 with the corresponding spoke depending upon the direction in which the vehicle is moved. It will of course be understood that in applying the jacking device it is applied from the outside of the wheel and in a position substantially at right angles to that shown in Fig. 1, the lower portions of the arms extending either ahead or behind the wheel depending upon the direction in which it is desired to move the vehicle in elevating the wheel.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. A lifting device for vehicle wheels comprising cooperating hub clamps and rigid supporting means for the hub clamps extending outwardly from the hub beyond the tread face of the wheel and having a supporting end positioned beyond the tread face of the wheel and located in substantial alinement with the hub clamps.

2. A wheel elevating device comprising ground engaging means adapted to be positioned upon one side of the wheel, and means carried by the ground engaging means adapted to engage the wheel hub upon the other side of the wheel and support the same when said wheel is rotated to bring the ground engaging means therebeneath.

WALTER B. CLIFFORD.